Figure 1:
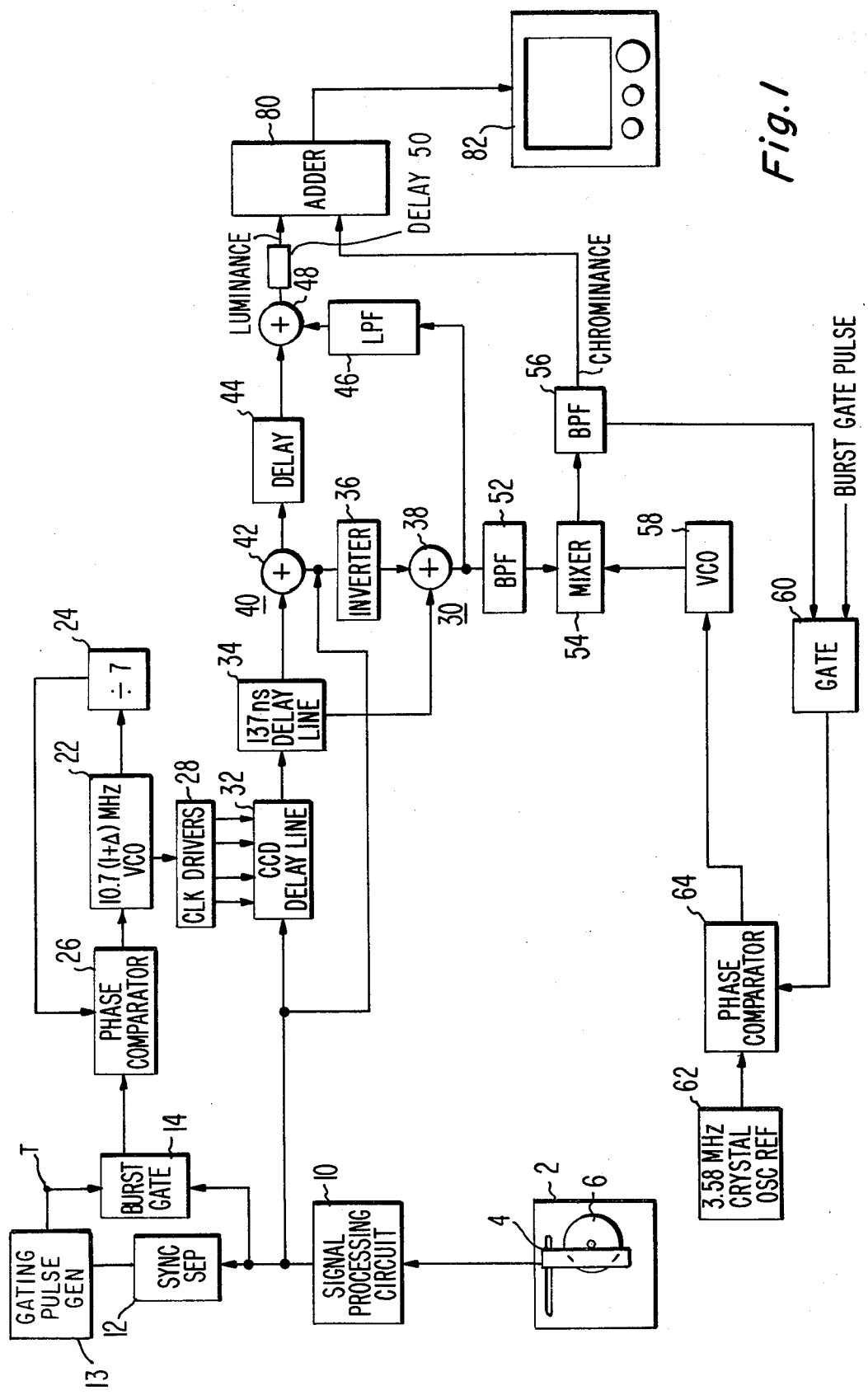

United States Patent [19]
Kawamoto

[11] 3,996,610
[45] Dec. 7, 1976

[54] COMB FILTER APPARATUS FOR VIDEO PLAYBACK SYSTEMS

[75] Inventor: Hirohisa Kawamoto, Kendall Park, N.J.

[73] Assignee: RCA Corporation, New York, N.Y.

[22] Filed: Dec. 29, 1975

[21] Appl. No.: 644,818

[52] U.S. Cl. .................................. 358/31; 358/8
[51] Int. Cl.² ...................................... H04N 9/02
[58] Field of Search ........................ 358/31, 4, 8

[56] References Cited
UNITED STATES PATENTS

| | | | |
|---|---|---|---|
| 3,580,991 | 5/1971 | Krause | 358/8 |
| 3,674,920 | 7/1972 | Faroudja | 358/31 |
| 3,871,020 | 3/1975 | Wilber | 358/8 |

*Primary Examiner*—Benedict V. Safourek
*Assistant Examiner*—Mitchell Saffian
*Attorney, Agent, or Firm*—Eugene M. Whitacre; William H. Meagher; Wendell K. Fredericks

[57] ABSTRACT

Comb filter apparatus for separating interleaved luminance and chrominance components of a composite color video signal employs a clock controlled delay line of the CCD type to which the composite signal is applied. A VCO supplies clock signals to the CCD delay line, and to a frequency divider. The output of the frequency divider is compared in phase with a color synchronizing component of the undelayed composite color video signal to develop an error signal, which is applied to the VCO in a sense opposing departures from a predetermined phase relationship between the divider output and the synchronizing component. Spurious frequency variations of composite signal components (e.g., accompanying recovery of composite signal by playback of a video disc) are followed by the VCO in a manner assuring that accurate combing of the composite signals occurs at the outputs of circuits providing desired combinations of the delay line input and output.

5 Claims, 2 Drawing Figures

COMB FILTER APPARATUS FOR VIDEO PLAYBACK SYSTEMS

The present invention relates generally to comb filter apparatus, and particularly to comb filter apparatus of a novel form capable of effecting accurate separation of interleaved components of a composite color video signal despite the occurrence of spurious variations of the composite signal frequencies.

An illustrative environment, where application of the principles of the present invention is particularly advantageous, is a playback system for a video record, such as, for example, a player for a video record of the disc type as described in U.S. Pat. No. 3,842,194, issued to Jon K. Clemens. In the operation of such a video disc player, failure to precisely maintain the proper speed of rotation of the disc can result in a sustained shift of the recovered signal frequencies from their proper values. Additionally, the presence of such factors as eccentricity of the disc record's information track relative to the center of rotation for the disc, and warps of the disc record's surface, can result in cyclical variations of relative motion between pickup and disc track that cause spurious fluctuations of the recovered signal frequencies, the fluctuations recurring at rates corresponding to the disc rotation frequency and harmonics thereof.

While the video disc player desirably may incorporate error reducing apparatus, such as a turntable synchronizing system of the type described in U.S. Pat. No. 3,912,283 (issued to J. L. Hammond, et al.) to oppose errors in the average speed of disc rotation, and a pickup position adjusting system of the "armstretcher" type disclosed in U.S. Pat. No. 3,711,641 (issued to R. C. Palmer) to oppose the cyclical variations in pickup/-disc relative motion, residual errors in the recovered signal frequencies are likely to be encountered.

Such recovered signal frequency errors pose a problem when the nature of the recorded signal format calls for the use of comb filtering in the player's processing of the recovered signals. For example, U.S. Pat. No. 3,872,498, issued to Dalton H. Pritchard, discloses a signal format establishing a composite color video signal in a so-called "buried subcarrier" form, a format which, as explained therein, is particularly advantageous for video disc record use. In the format proposed by Pritchard, chrominance information is represented by a modulated color subcarrier, of the general form employed in the well-known NTSC system. However, the chrominance component is not located in the high end of the luminance signal video band, as in the NTSC system, but rather is buried in the middle of the video band; an illustrative subcarrier frequency choice is in the vicinity of 1.53 MHz., with the color subcarrier sidebands extending ± 500 KHz. thereabout, and with the luminance signal band extending well above the highest color subcarrier sideband frequency (to 3 MHz., for example). By suitably offsetting the subcarrier frequency from an integral multiple of the line frequency associated with the video signal (e.g., choosing the subcarrier frequency to equal 195/2 times the line frequency), and by effecting suitably complementary comb filtering of the respective luminance and chrominance signals prior to their combination, one may form for recording purposes a composite signal having its midband shared by luminance and chrominance components, without deleterious cross-talk introduction in the forming process. However, as also disclosed in said Pritchard patent, it is appropriate, in apparatus for playback of a record bearing color picture information in the aforesaid buried subcarrier format, to use comb filtering to obtain from the recovered composite signals (1) the recorded luminance signal substantially free of the midband chrominance components, and (2) the recorded chrominance information substantially free of midband luminance components. In such use of comb filtering in the record playback system, the presence of frequency errors in the recovered composite signals (due to such causes as were discussed previously) may interfere with attainment of the desired degree of separation of the respective luminance and chrominance components.

In the copending U.S. Pat. application of Dalton H. Pritchard, Ser. No. 559,401, filed on Mar. 18, 1975, a comb filter arrangement employing a clock controlled delay line such as one of the so-called CCD (charge coupled device) type, is disclosed as suitable for the aforementioned comb filtering function is a record playback system. The frequency of the clock signals applied to the delay line in the arrangement of said Pritchard application is rendered responsive to the frequency errors of the recovered, composite signals so as to vary the delay imparted by the delay line in consonance with the frequency errors. As a consequence, shifts of the multiple peaks and multiple rejection notches of the frequency response characteristics of the player's comb filters occur with a sense and timing in consonance with the sense and timing of spurious shifts of the constituent frequencies of the recovered composite signals.

The present invention is directed to comb filter apparatus wherein the variable delay approach of the Pritchard application is implemented in a novel manner such that substantial matching is ensured between the magnitude of spurious shifts of the constituent frequencies of an input composite signal and the magnitude of the associated shifts of the multiple peaks and multiple rejection notches of the frequency response characteristic of the comb filter. Illustratively, such comb filter apparatus can be utilized to separate the luminance and chrominance components of recorded composite signals having the aforesaid buried subcarrier format, with assurance that the accuracy of separation is substantially independent of spurious frequency errors engendered in the recovery of the composite signals from a record.

In accordance with an illustrative embodiment of the present invention, a delay line of a CCD type is employed to impart delay to composite color video signals recovered from a record. The delay duration is determined by the frequency of clocking signals, derived from an output of a voltage controlled oscillator and applied to the clock input terminals of the CCD delay line. A frequency divider, responsive to an output of the oscillator develops a frequency divided output, which is applied to a phase detector for phase comparison with a reference signal component (e.g., color synchronizing burst) of the input composite signal. An error signal developed by the phase detector controls the oscillator frequency in a sense opposing departures from a predetermined phase relationship between the respective inputs to the phase detector.

The nominal output frequency of the oscillator (e.g., the oscillator output frequency developed in the absence of error indication) is desirably an integral multiple of the nominal frequency of the reference signal component (i.e., the reference signal frequency developed in the absence of any time base error). The number of charge transfer elements employed in the CCD delay line is selected so that, with clocking at said nominal oscillator output frequency, the composite video signal suffers a delay corresponding to a period at the nominal line frequency of the composite video signal (i.e., the line frequency developed in the absence of any time base error). A first signal combiner, additively combining the delay line input and output signals, forms a comb filter which, during clocking at said nominal oscillator output frequency, has a frequency response characteristic with multiple response peaks falling at even integral multiples of half the nominal line frequency, and multiple rejection notches falling at odd integral multiples of half said nominal line frequency. A second signal combiner, subtractively combining the delay line input and output signals, forms a comb filter which, during clocking at said nominal oscillator output frequency, has a frequency response characteristic with multiple response peaks falling at odd integral multiples of half the nominal line frequency, and multiple rejection notches falling at even integral multiples of half the nominal line frequency.

When a time base error is incurred in the record playback process that results, for example, in a given percentage shift upward of the frequency of the reference signal component, the above-described oscillator control system effects an increase of the oscillator frequency by a corresponding percentage. The higher clocking rate results in a reduction of delay imparted by the CCD delay line. The reduced duration is equal to a period at a frequency corresponding to the nominal line frequency shifted upward by said given percentage. Accordingly, the characteristics of the comb filters, utilizing combinations of the delay line input and output signals, experience upward shifts of their respective response peaks and rejection notches by a similar percentage. In the instance of a downward shift of the frequency of the reference signal component, of course, the direction of the corresponding percentage shifts of the peak and notch frequencies is also downward. Thus, in operation of the described arrangement, the efficacy of the luminance/chrominance signal separation achieved by the comb filters is rendered substantially independent of time base errors incurred in the record playback process.

Figure 2:
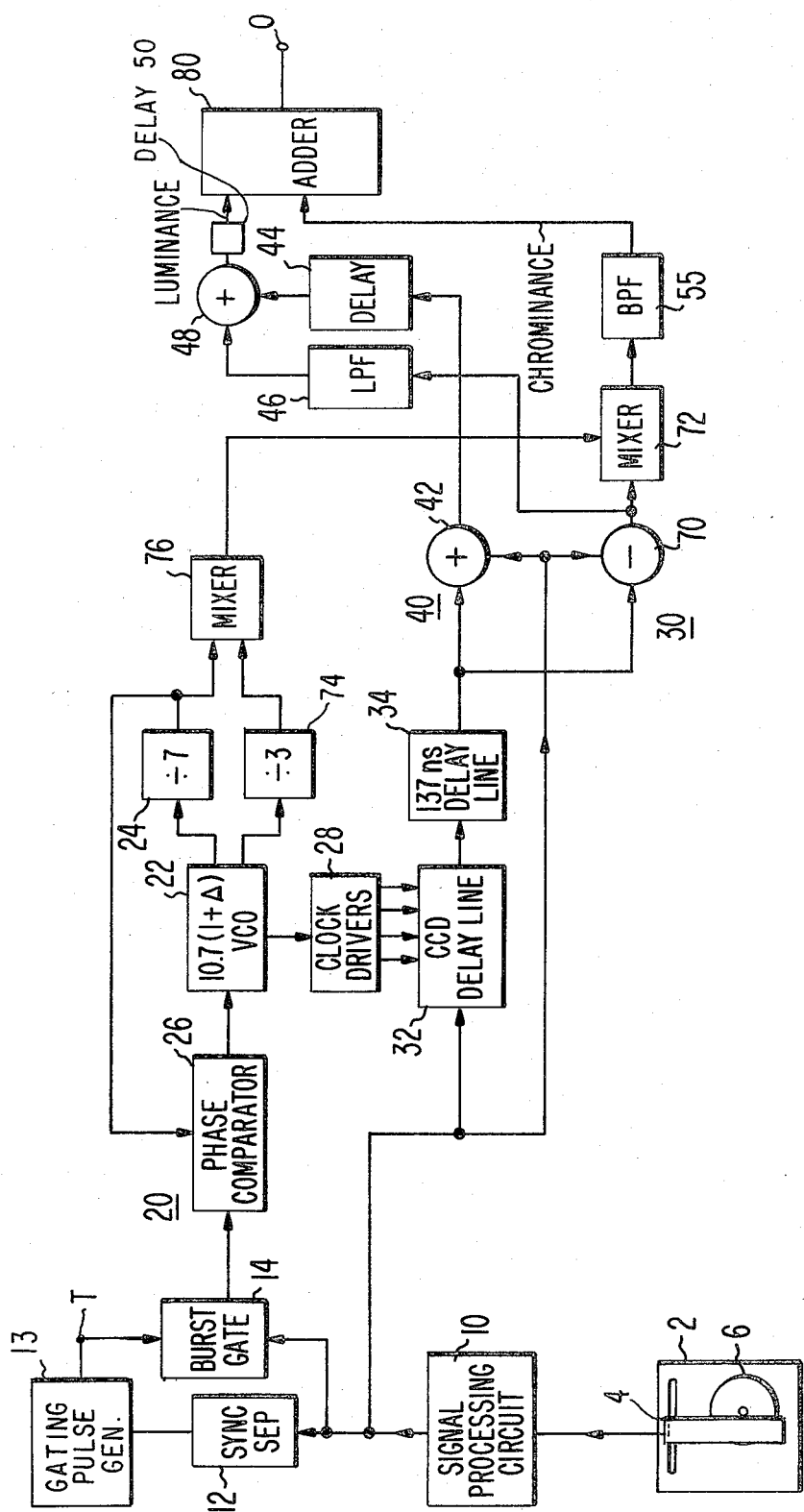

In the accompanying drawings:

FIG. 1 illustrates a record playback system employing a comb filter arrangement embodying the principles of the present invention; and FIG. 2 illustrates a modification of the system of FIG. 1 in accordance with a further embodiment of the present invention.

Referring to FIG. 1, a signal pickup arm structure 4 of a video disc player 2 (illustratively, of the type disclosed in the aforementioned Clemens patent) is arranged to sense color picture information recorded in a spiral information track, on disc record 6 when record 6 is rotated and arm 4 is moved radially across record 6.

Pickup arm 4 is coupled to an input of signal processing circuit 10, which serves to derive a composite color video signal from the sensed information. Illustratively, the composite color video signal output of processing circuit 10 is in a buried subcarrier format as disclosed in the aforementioned Pritchard patent. The luminance component occupies a frequency band extending from 0 to about 3 MHz. The chrominance component comprises a modulated color subcarrier, with the subcarrier frequency falling in the midband of the luminance component (e.g., in the vicinity of 1.53 MHz) at an odd integral multiple of half the line frequency with sidebands extending thereabout ± 500 KHz. The composite signal also includes conventional deflection synchronization pulses, as well as a color synchronizing signal comprising bursts of the color subcarrier frequency appearing during the back porch portion of the recurring horizontal blanking intervals.

During the process of transferring the recorded color picture information from disc record 6 to signal processing circuit 10, the failure to precisely maintain the proper rotation speed of record 6 can effect a sustained shift of the recovered composite video signal frequencies from their proper values. Also, the existence of such conditions as eccentricities of the information track of disc record 6 relative to the center of rotation for record 6, and warps of the surface of record 6, can produce cyclical variations of relative motion between pickup arm 4 and the information tracks of record 6 of a magnitude that spurious fluctuations of the recovered composite signal frequencies occur, the fluctuations recurring at rates corresponding to the rotation frequency of record 6 and harmonics thereof.

The composite color video signal output of signal processing circuit 10 is applied to a sync separator circuit 12 serving to extract horizontal sync pulses from the composite color video signal.

The extracted horizontal sync pulses are coupled to a gating pulse generator 13 wherein gating pulses, suitably delayed relative to the horizontal sync pulses, are developed therefrom with a timing substantially coincident with the aforementioned back porch portions of the recurring horizontal blanking intervals. The gating pulse output of gating pulse generator 13 (appearing at terminal T) is coupled to a burst gate 14, also responsive to the composite video signal output of signal processing circuit 10. Burst gate 14 serves to selectively pass the color synchronizing component of the composite signal to its output.

The color synchronizing bursts appearing at the output of burst gate 14 are applied as a first input to a phase comparator 26. A second input to phase comparator 26 is derived from an output of a voltage controlled oscillator (VCO) 22 by a frequency dividing circuit 24. The nominal operating frequency of VCO 22 is chosen to be an integral multiple of the nominal frequency of the color burst signal (i.e., an integral multiple of the recovered color subcarrier frequency absent any time base error); illustratively, VCO 22 is chosen to have a nominal operating frequency seven times the illustrative color subcarrier frequency of 1,534,091 Hz, (i.e., an operating frequency of approximately 10.7 MHz.). Frequency division by the aforesaid integral multiple is effected for an output of VCO 22 by the frequency dividing network 24, so that the output of frequency dividing network 24 corresponds to the frequency of the separated synchronizing bursts in the absence of any time base error. Departures from a predetermined phase relationship between the two inputs to comparator 26 results in the development of an error voltage signal by comparator 26. The error voltage signal is used to control the frequency of operation of VCO 22 in a sense that opposes said departures from said predetermined phase relationship between said comparator inputs.

An output of VCO 22 is used to control the clocking of a clock-controlled delay line 32, which is, for example, a CCD delay line of the buried channel type (e.g., as described in the article by J. Matov, entitled "Charge Coupled Devices" and appearing in the January 1975 issue of Wireless World). For this purpose, an output of VCO 22 is coupled to a clock driver circuit 28. Driver circuit 28 illustratively includes a phase splitter circuit (not shown in FIG. 1) that splits the incoming clock signal from VCO 22 into two 180° out-of-phase clock pulse signals, and a plurality of drivers responding thereto to develop suitably phased clock input signals for delay line 32.

These clock input signals from clock driver circuit 28 are coupled to the appropriate clock terminals of CCD 32. Coupled to an input of CCD 32 is the composite color video signal from signal processing circuit 10. CCD 32 is used to provide a delay to the composite signal which varies in concert with the spurious fluctuations of the composite signal frequencies, as will be subsequently explained. The composite video signal is transferred through CCD 32, in the form of incremental charges in potential wells created at the surface of a semiconductor. The clock input signals coupled to the clock terminals of CCD 32 are employed to move the charges along the semiconductor surface from potential well to potential well, in a desired direction of signal flow. The transition time for signals passing through CCD 32 is directly proportional to the number of charge-transfer elements contained in the device and inversely proportional to the clock frequency of the pulses from clock driver 28. For application of this invention, the number of charge transfer elements contained in CCD 32 is selected so that when CCD 32 receives clock pulses from clock drivers 28 at the nominal oscillating frequency of VCO 22, the composite video signal being transferred experiences a delay substantially corresponding to one period at the nominal line frequency for the composite video signal (i.e., one period at the line frequency developed in the absence of any time base errors).

The delayed composite video signal being transferred is coupled from an output of CCD 32 to the input of a second delay line 34. Delay line 34 is illustratively a trimmer delay line that adds an additional fixed delay to the clocked delay provided by delay line 32 so that the combined delay time of the two delay lines (in the absence of time base errors) is precisely one period of a horizontal line at the nominal line frequency. Illustratively, for the nominal clock and line frequencies herein given as examples, delay line 34 is adjusted to provide a 137 nanosecond delay.

The input video signal to delay line 32 and the output signal from delay line 34 are coupled to a first signal combiner 42 where these two signals are additively combined. Delay lines 32 and 34 and combiner 42 form a comb filter which desirably separates the luminance component from the composite color video signal. When the clock frequency output of VCO 22 is at the nominal oscillator output frequency (indicative of no spurious deviations of the composite signal frequencies), this luminance comb filter has a frequency response characterized by multiple response peaks falling at even multiples of half the nominal line frequency and multiple rejection notches falling at odd integral multiples of half the nominal line frequency.

When a time base error occurs in the record playback process that produces, illustratively, a given percentage shift upward of the frequency of the color burst reference signal component, the above-described oscillator control system effects an increase of the operating frequency of VCO 22 by a corresponding percentage. CCD 32 imparts a reduction of delay since the delay of the device is inversely proportional to the clock frequency. The reduced delay is equal to a period at a frequency corresponding to the nominal line frequency shifted upward by the given percentage. Thus, the characteristic of the luminance comb filter formed by the delay lines 32 and 34 and first combiner 42 experiences a similar percentage upward shift of the respective response peaks and rejection notches. If a downward shift of the frequency of the color burst reference signal component occurs, then the direction of the corresponding percentage shifts of the peak and notch frequencies is also downward.

The input signal to delay line 32 is also coupled to an input of inverter 36 which reverses the polarity of the composite video signal. The output of inverter 36 and the output of delay line 34 are coupled to second signal combiner 38 where these two signals are additively combined. Delay lines 32, 34, inverters 36 and combiner 38 form a second comb filter 30 which desirably passes the chrominance component of the composite video signal. When clocking of delay line 32 occurs at the nominal VCO operating frequency (in the absence of time base errors), this chrominance comb filter has a frequency response characteristic having multiple response peaks falling at odd integral multiples of half the nominal line frequency and multiple rejection notches falling at even integral multiples of half the nominal line frequency. When time base errors occur, the peak and notch frequencies of the chrominance comb filter shift in the same manner as described above for the luminance comb filter 40.

The output of the luminance comb filter 40 is applied via a delay circuit 44 to a signal combiner 48 for additive combination with the output of a low pass filter 46 coupled to an output of the chrominance comb filter 30. This combining process serves to supplement the luminance comb filter output with luminance information relating to vertical detail (rejected in the luminance comb filter in the course of chrominance component removal, but available at the output of the chrominance comb filter 30). A passband of 0–500 KHz., for example, for low pass filter 46 permits restoration of a reasonably adequate amount of vertical detail. Delay circuit 44 is interposed between combiners 42 and 48 to substantially match the delay introduced by filter 46, so that the respective luminance components being combined are in proper phase relationship.

The output of signal combiner 38 is also coupled to a band pass filter 52. Filter 52 has a passband chosen to suppress signals outside the midband location occupied by the buried subcarrier chrominance components. The output of filter 52 is coupled to mixer 54 where this filtered signal is heterodyned with oscillations from VCO 58. The frequency of the oscillations from VCO 58 is controlled by an error voltage developed by phase comparator 64. The error voltage from comparator 64 results from comparing the phase of a gated burst component of the output signal from mixer 54 with the phase of the output of a crystal controlled reference oscillator 62.

The nominal operating frequency of VCO 58 is chosen to match the sum of the nominal buried subcarrier frequency and a desired output subcarrier frequency. Illustratively, the desired output subcarrier frequency corresponds to the NTSC subcarrier value of 3,579,545 Hz, whereby the desired value for the nominal operating frequency of VCO 58 falls at approximately 5.11 MHz. The frequency of operaton of reference oscillator 62 corresponds to the desired output subcarrier frequency (e.g., approximately 3.58 MHz.). The heterodyning action of mixer 54 develops, inter alia, a frequency shifted version of the buried subcarrier chrominance component which falls about the desired output subcarrier frequency (e.g., 3.58 MHz.); this frequency shifted version is selectively passed by a band pass filter 56. A burst gate 60, controlled by gating pulses derived from terminal T, selectively passes the color synchronizing burst component of the frequency shifted signal to phase comparator 64. An error voltage is developed by comparator 64 upon departures from a predetermined phase relationship between the output of reference oscillator 62 and the burst component of the frequency shifted signal; the error voltage application to VCO 58 adjusts its operating frequency to oppose such departures. As a consequence of this control of the operating frequency of VCO 58, the component frequencies of the frequency shifted chrominance signal appearing at the output of band pass filter 56 are stablized (i.e., substantially free of the spurious frequency deviations that constitute the time base error incurred in the playback process).

The chrominance signal output of band pass filter 56 is applied to an adder 80. The luminance signal output of combiner 48 is also applied to adder 80 via a delay circuit 50 (with the delay imparted by delay circuit 50 chosen so that the luminance signal input to adder 80 has suffered substantially the same delay as the bandpass filtered chrominance signal input thereto).

The output of adder 80 is a reconstructed composite video signal in a form suitable for acceptance by a color television receiver 80 to effect reproduction of the recorded color pictures. Where it is desired to apply the recorded information to the receiver via its antenna terminals, the application may be effected via suitable transmitter apparatus, such as shown, for example, in U.S. Pat. No. 3,775,555 of D. J. Carlson.

FIG. 2 illustrates a modification of the circuitry of FIG. 1 in accordance with a further embodiment of the present invention. Control of comb filtering of the composite video signal output of processing circuit is achieved in FIG. 2 in the same manner as in FIG. 1, and does not require redescription. The FIG. 2 arrangement, however, differs in the manner in which the separated chrominance component is frequency shifted to a desired output band.

The output of the chrominance comb filter 30 appears at the output of a subtractive combiner 70 (equivalent to the FIG. 1 combination of inverter 36 and additive combiner 38) and is applied to a mixer 72, as in FIG. 1. However, the additional heterodyning oscillations applied to mixer 72 are derived from the output of VCO 22 (rather than from the output of an additional oscillator, as in FIG. 1). The derivation is effected through the provision of an additional frequency dividing network 74, coupled to an output of VCO 22, and the application of the outputs of both frequency dividing networks (24, 74) to an additional mixer. By selecting a frequency dividing factor of three for network 74, one may develop an output from mixer 76 that has a nominal frequency corresponding to the illustratively desired 5.11 MHz.

While the FIG. 2 embodiment is somewhat simplified relative to the FIG. 1 system, the composite signal output at terminal 0 of the adder 80 of FIG. 2 is not subject to the chrominance component frequency stabilization described for the FIG. 1 arrangement. However, where chrominance signal processing circuitry utilizing the output of adder 80 of FIG. 2 is suitably tolerant of subcarrier frequency deviations, the absence of stabilization may be endured.

What is claimed is:
1. A comb filter apparatus for filtering a composite color video signal, wherein said composite color video signal includes chrominance and luminance signal components, and wherein said chrominance component includes a reference signal component, said composite color video signal components being undesirably subject to spurious frequency variations; said apparatus comprising:
   a. means for receiving said composite color video signal;
   b. a clock controlled variable delay line, having clock input terminals and having a video signal input terminal coupled to said receiving means, for imparting to said composite color video signal a delay of a magnitude determined by the frequency of clock signals applied to said clock input terminals;
   c. a voltage controlled oscillator for developing said clock signals;
   d. a frequency dividing network coupled to said oscillator;
   e. a phase comparator, responsive to an output of said frequency dividing network and to the reference signal component of the composite color video signal received by said receiving means, for developing an error signal representative of departures from a predetermined phase relationship between said reference signal component and said output of said frequency dividing network;
   f. means for applying said error signal to said oscillator to control the frequency of operation thereof in a sense to oppose said departures from said predetermined phase relationship between said reference signal component and said output of said frequency dividing network;
   g. means, including a first signal combiner responsive to respective outputs of said receiving means and said delay line, for developing signals representative of said chrominance component to the substantial exclusion of said luminance component; and
   h. means, including a second signal combiner responsive to respective outputs of said receiving means and said delay line, for developing signals representative of said luminance component to the substantial exclusion of said chrominance component.

2. Apparatus in accordance with claim 1 wherein said chrominance component representative signal developing means includes frequency conversion means for shifting the frequency of said chrominance component.

3. Apparatus in accordance with claim 2 including means for combining the frequency shifted chrominance component output of said frequency conversion means with the output of said luminance component representative signal developing means to provide a composite color video signal output.

4. Apparatus in accordance with claim 3 wherein said frequency conversion means includes a second voltage controlled oscillator;

means for heterodyning an output of said second voltage controlled oscillator with an output of said first signal combiner;

a source of reference oscillations;

comparator means for comparing said reference oscillations with an output of said heterodyning means to develop an error signal indicative of deviations from a predetermined phase relationship between said reference oscillations and the reference signal component of said frequency shifted chrominance component; and means for applying said error signal to said second voltage controlled oscillator to alter its frequency of operation in a sense to oppose said deviations.

5. Apparatus in accordance with claim 3 wherein said frequency conversion means includes:
 a second frequency dividing network coupled to said oscillator;
 a first means for heterodyning an output of said first-named frequency dividing network with an output of said second frequency dividing network; and
 a second means for heterodyning an output of said first signal combiner with an output of said first heterodyning means.

* * * * *